United States Patent
Golding et al.

(10) Patent No.: US 6,640,218 B1
(45) Date of Patent: Oct. 28, 2003

(54) ESTIMATING THE USEFULNESS OF AN ITEM IN A COLLECTION OF INFORMATION

(75) Inventors: Andrew R. Golding, Waltham, MA (US); Douglas H. Beeferman, Waltham, MA (US)

(73) Assignee: Lycos, Inc., Waltham, MA (US)

(*) Notice: Subject to any disclaimer, the term of this patent is extended or adjusted under 35 U.S.C. 154(b) by 218 days.

(21) Appl. No.: 09/587,144

(22) Filed: Jun. 2, 2000

(51) Int. Cl.$^7$ ............................................. G06F 17/30
(52) U.S. Cl. .................................. 707/2; 707/3
(58) Field of Search ........................ 455/4.2; 707/3, 707/2

(56) References Cited

U.S. PATENT DOCUMENTS

| | | | |
|---|---|---|---|
| 5,321,833 A | | 6/1994 | Chang et al. ............ 395/600 |
| 5,535,382 A | | 7/1996 | Ogawa ................... 395/600 |
| 5,754,939 A | * | 5/1998 | Herz et al. .............. 455/3.04 |
| 5,878,223 A | * | 3/1999 | Becker et al. ............ 709/223 |
| 5,983,214 A | | 11/1999 | Lang et al. .............. 707/1 |
| 6,006,222 A | | 12/1999 | Culliss ................... 707/5 |
| 6,012,053 A | * | 1/2000 | Pant et al. ............... 707/3 |
| 6,014,665 A | | 1/2000 | Culliss ................... 707/5 |
| 6,029,161 A | | 2/2000 | Lang et al. .............. 707/1 |
| 6,078,916 A | | 6/2000 | Culliss ................... 707/5 |
| 6,108,493 A | * | 8/2000 | Miller et al. ............. 707/2 |
| 6,115,718 A | * | 9/2000 | Huberman et al. ........ 707/102 |
| 6,286,018 B1 | * | 9/2001 | Pitkow et al. ............ 707/3 |
| 6,366,956 B1 | * | 4/2002 | Krishnan ................. 707/4 |

OTHER PUBLICATIONS

Boyan et al., "A Machine Leaning Architecture for Optimizing Web Search Engines", School of Computer Science Carnegie Mellon University, pp 1–8, May 1996.

Brin and Page, "The Anatomy of a Large–Scale Hypertextual Web Search Engine", http://www7.scu.edu.au/programme/fullpapers/1921/com1921.htm.

Fuhr et al., "Probabilistic Learning Approaches for Indexing and Retrieval with the TREC–2 Collection", University of Dortmund, Germany, Cornell University, pp. 67–74.

Joachims et al. "A Tour Guide for the World Wide Web", WebWatcher School of Computer Science Carnegie Mellon University, pp. 1–26, 1996.

Savoy, "A new probabilistic scheme for information retrieval in hypertext", The new Review of Hypermedia and Multimedia, vol. 1:107–135, 1995.

* cited by examiner

*Primary Examiner*—Safet Metjahic
*Assistant Examiner*—Cam-Linh Nguyen
(74) *Attorney, Agent, or Firm*—Fish & Richardson P.C.

(57) ABSTRACT

A measure of the usefulness of an item in a collection of information with respect to a first set of one or more criteria is determined. A first measure of the usefulness of the item with respect to the first set of criteria is determined. A measure of the quality of the item is determined. A second measure of usefulness based on the first measure of usefulness and the measure of quality is determined.

30 Claims, 6 Drawing Sheets

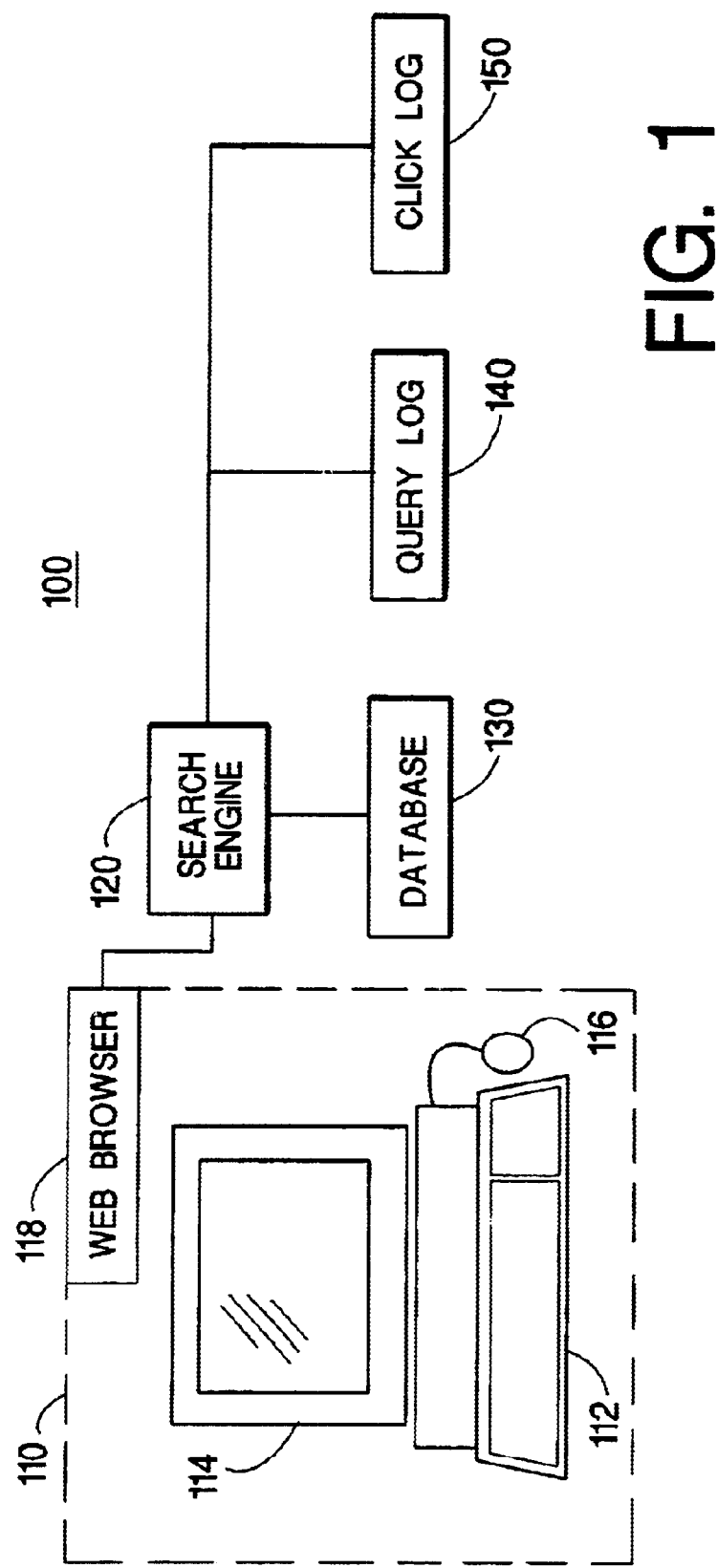

610 — FOR EACH NORMALIZED QUERY WITH WHICH ITEM IS ASSOCIATED, APPLY SELECTION RATE PREDICTOR FUNCTION TO RELEVANCE RANK OF ITEM WITH RESPECT TO THAT QUERY, AND MULTIPLY RESULT BY NUMBER OF TIMES QUERY WAS SUBMITTED

620 — SUM THE PRODUCTS FROM STEP 610 TO DETERMINE PREDICTED POOLED POPULARITY

FIG. 7

ESTIMATING THE USEFULNESS OF AN ITEM IN A COLLECTION OF INFORMATION

TECHNICAL FIELD

The invention relates to estimating the usefulness of an item in a collection of information.

BACKGROUND

One context in which selection of items from a collection of information (e.g., a database) is useful is a "search engine." A typical search engine takes an alphanumeric query from a user (a "search string") and returns to the user a list of one or more items from the database that satisfy some or all of the criteria specified in the query.

Although search engines have been in use for many years, for example in connection with the Westlaw® or Lexis® & legal databases, their use has risen dramatically with the development of the World Wide Web. Because the World Wide Web comprises a very large number of discrete items, which come from heterogeneous sources, and which are not necessarily known in advance to the user, search engines that can identify relevant Web-based information resources in response to a user query have become important tools for doing Web-based research.

With tens or hundreds of millions of individual items potentially accessible over the Web, it is not unusual for a single query to a search engine to result in the return of hundreds or thousands of items of varying quality from which the user must manually select those that may be truly useful. This manual evaluation can be a time consuming and frustrating process.

One approach to managing the large number of potentially relevant items returned by a search engine is for the engine to rank the items for relevance before displaying them. Specifically, the items may be ranked according to some relevance metric reflecting how well the intrinsic features of a particular item (e.g., its textual content, its location, the language in which it is written, the date of its creation, etc.) match the search criteria for the particular search. A number of relevance metrics are described, e.g., in Manning and Schuitze, "Foundations of Statistical Natural Language Processing", MIT Press, Cambridge, Mass. (1999) pp. 529–574 and U.S. Pat. No. 6,012,053.

Ranking items based on a measure of relevance to a search query is, however, often an imperfect measure of the actual relative usefulness of those items to users. In particular, a relevance metric may not take into account certain factors that go into a user's ultimate evaluation of the usefulness of a particular item: e.g., how well the item is written or designed, the reliability or authority of the source of the information in the item, or the user's prior familiarity with the item. Thus, a search engine presented with a query for "History of the United States" might consider an encyclopedia article by a well-known historian and a term paper written by a high school student to be of equal relevance, even though the former is far more likely to be useful to most users than the latter.

Ranking items by relevance is also susceptible to "spoofing." "Spoofing" refers to attempting to artificially improve the apparent relevance of a particular item with respect to particular search criteria by altering the item in a misleading way. For example, it is common for search engines to evaluate the relevance of a Web page based on the contents of meta-tags. Meta-tags are lists of keywords that are included in the HTML source of a Web page but which are not normally displayed to users by Web browsers. Web site operators who wish to increase the number of visits to their Web sites commonly attempt to spoof search engines by creating meta-tags that contain either keywords that are not truly indicative of the displayed contents of the page (but which are likely to match a large number of queries), or by creating meta-tags that include multiple instances of arguably appropriate keywords (thus inflating the relative importance of that keyword to the Web page).

Some search techniques have attempted to incorporate information about subjective user preferences within a relevance metric. One such method entails modifying the relevance score of an individual item (with respect to a search term or phrase) according to how often the item is selected when displayed in response to a query containing the search term or phrase. However, this technique may provide unsatisfactory results under conditions of sparse data (i.e., where the individual items were selected by users in response to queries containing the search term or phrase a relatively small number of times).

SUMMARY

The present invention provides a system and method for estimating the usefulness of an item in a collection of information.

In general, in one aspect, a first measure of the usefulness of the item with respect to the first set of criteria is determined. A measure of the quality of the item is determined. A second measure of the usefulness of the item is determined based on the first measure of usefulness and the measure of quality.

Embodiments of the invention may have one or more of the following features.

A measure of the relevance of the item to the first set of criteria is determined. A selection rate of the item is predicted based on the measure of relevance.

Opportunities for user selection of the item are provided. The actual overall popularity of the item is determined. The overall popularity of the item is predicted. The measure of quality of the item is determined based on the actual popularity of the item and the predicted overall popularity of the item.

A plurality of sets of items containing the item is displayed. A choice of the item from at least one of the sets of displayed items is received from a user.

At least one set of items containing the item is displayed ranked in accordance to a relevance metric.

At least one set of items containing the item is displayed ranked in accordance to a measure of the usefulness of the respective items.

Users are provided with opportunities to present sets of criteria. Respective measures of the relevance of the item to respective sets of criteria presented by users are determined. Respective selection rates of the item are predicted based on the respective measures of relevance. The overall popularity of the item is predicted based on the respective predicted selection rates.

Respective measures of the popularity of the respective sets of criteria among users are determined. The overall popularity of the item is predicted based on the respective predicted selection rates and the respective measures of the popularity of the respective sets of criteria.

The rank of the item in a list of items relevant to the set of criteria and ranked according to a relevance metric is determined.

The number of times that the item was selected by a user during a pre-determined period of time is determined.

The collection of information comprises a catalog of information resources available on a public network.

The collection of information comprises a catalog of information available on the World Wide Web.

Data concerning selection of the item by users is collected. An anti-spoof criterion is applied to the data. The actual overall popularity of the item is decreased based on the results of applying the anti-spoof criterion to the data.

Respective first measures of the usefulness of respective other items in the collection of information with respect to the first set of criteria are determined. Respective measures of the quality of the respective other items are determined. Respective second measures of usefulness of the respective other items are determined based on the respective first measures of usefulness and the respective measures of quality. The item and the other items are displayed ranked according to the respective second measures of usefulness.

Items from a collection of information are displayed ranked according to a relevance metric that is different from the second measures of usefulness.

The items displayed according to the relevance metric are from a different collection of information than the items displayed according to respective second measures of usefulness.

The first set of criteria is based on a search criterion received from a user.

The first set of criteria is based on a user profile.

The first set of criteria is based on a user's prior search patterns.

Users are provided with at least one preferred interface for selecting the items from lists of items. The actual overall popularity of the item is determined without regard to selection of the item using interfaces other than a preferred interface.

Users are provided with opportunities to select items from lists of items ranked according to ranking criteria. Data about selection rates of items having particular ranks is collected. The selection rate of the item is predicted based on the rank of the item and the data about selection rates of items having particular ranks.

The respective predicted selection rates are multiplied by the respective measures of popularity of respective sets of criteria. The resulting products are added to determine the predicted overall popularity of the item.

Applying the anti-spoof criterion includes comparing the actual overall popularity of the item to a threshold value.

Applying the anti-spoof criterion includes comparing the actual overall popularity of the item in a particular time period to the actual overall popularity of the item in other time periods.

Applying the anti-spoof criterion includes determining the entropy of a selection rate of the item in a series of time periods and comparing the entropy to a threshold value.

The selection rate of an item is based on the number of times the item is selected during a given period relative to the number of queries made by users during that period.

The selection rate of an item is based on the number of times the item is selected during a given period relative to the number of selections of items during that period.

In general, in another aspect, a system for determining a measure of the usefulness of an item in a collection of information with respect to a first set of one or more criteria is provided. The system may include means for determining a first measure of the usefulness of the item with respect to the first set of criteria, means for determining a measure of the quality of the item, and means for determining a second measure of usefulness based on the first measure of usefulness and the measure of quality.

The system may include a computer processor, and a memory for holding the collection of information, wherein the computer processor is programmed to determine a first measure of the usefulness of the item with respect to the first set of criteria, determine a measure of the quality of the item, and determine a second measure of usefulness based on the first measure of usefulness and the measure of quality.

In general, in another aspect, a computer program residing on a computer readable medium is provided for determining a measure of the usefulness of an item in a collection of information with respect to a first set of one or more criteria. The computer program may include instructions for causing a computer to determine a first measure of the usefulness of the item with respect to the first set of criteria, determine a measure of the quality of the item, and determine a second measure of usefulness based on the first measure of usefulness and the measure of quality.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1$a$ is a functional block diagram of a database, a query log and a click log.

FIGS. 2–7 are flow charts.

DETAILED DESCRIPTION

Figure 1A:
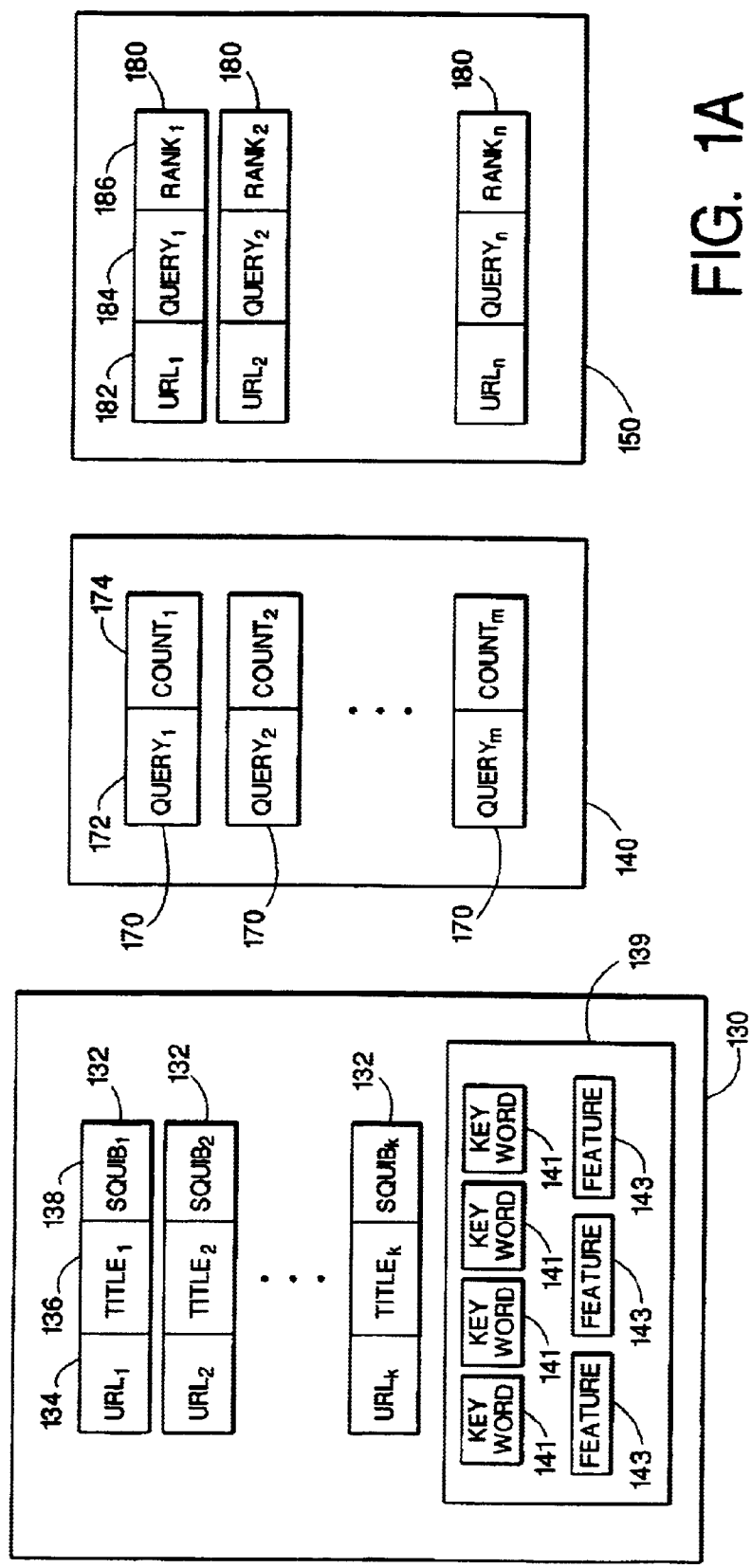
FIG. 1 is functional block diagram of a data processing system according to the invention.

The present invention provides a system and method for estimating the relative usefulness (with respect to a particular purpose, such as a set of user defined criteria) of an item of information in a collection of information. This system and method are applicable for example to ordering the search results of a database search, such as the search results returned by an Internet search engine.

When a user enters one or more search criteria into an information retrieval system, the information retrieval system can identify a set of items of information that satisfy the user's criteria. It can further apply a "relevance metric" that returns a score indicating the degree to which each item is relevant to the user's criteria. The items can then be ranked according to these relevance scores.

However, once search results are displayed to users, they are likely to evaluate them based not only on their relevance, but also on the basis of other criteria that are either not within the domain of the relevance metric, or were for some other reason not supplied by the user to the information retrieval system. For example, a user may desire an item of information that is "well written," or from "a reputable source," or "visually attractive" or "easy to use" and it might be difficult or impossible or inconvenient for the user to supply such criteria to the information retrieval system, or for the information retrieval system to meaningfully apply such criteria to the retrieved items. Such criteria not supplied by users to the information system will be referred to as "qualitative criteria," and how well an item matches a user's qualitative criteria will be referred to as its "quality." While it may not be possible or practical to obtain a useful measure of subjective quality of an item to a user in a particular instance, it is reasonable to assume that many qualitative criteria, i.e., "well written", or "from a reputable source," will remain fairly constant across users and queries. Thus it makes sense to speak of "quality" as a characteristic of an item, independent of any particular user or query.

It may be assumed that, all things being equal, users will find high quality items more useful than low quality items. Thus, the overall usefulness of an item in a particular case can be thought of as a function both of its relevance to the user's query, and of its quality.

A value that reflects the quality of an item can be estimated by comparing the aggregate popularity of the item (i.e., how often users select it) to a prediction of its aggregate popularity based solely on considerations of relevance. The ratio of these two values can be thought of as a "quality-based correction factor" that indicates how much a purely relevance based prediction must be "corrected" in order to produce a prediction that takes both relevance and quality into account. Using such a factor, the ultimate usefulness of the item with respect to particular criteria can then be estimated by estimating the item's popularity based on its relevance, and then correcting that estimate using the item's quality-based correction factor.

The prediction of how popular an item would have been based solely on considerations of relevance may be made using a predictor function that predicts how frequently an item having a certain measure of relevance to some criteria will, on average, be selected. The values of this function may be determined based on historical data, i.e., how often such items having a given measure of relevance to some criteria have been selected in the past. Thus, the predictor function may be a lookup function that maps measures of relevance to empirically determined selection probabilities. Alternatively, a closed form equation that approximates the empirical data may be used.

Thus, a prediction, based solely on considerations of relevance, of the popularity of an item among users having particular criteria can be made as follows: By first determining the relevance of the item with respect to the criteria, then using the predictor function to predict the rate at which the item would be selected by a user, and then multiplying that result by the number of times a user has presented those criteria for retrieving items.

Similarly, a prediction of the overall popularity of the item based solely on relevance could be made as follows: By making a prediction of the popularity of the item with respect to each set of criteria that have previously been presented by users, and then summing these values to obtain a predicted overall popularity. (In practice the sets of criteria considered in this determination may be limited to those for which the item has been selected by at least one user in the past.)

Once the predicted overall popularity of the item has been determined, a quality-based correction factor may be determined by dividing the actual overall popularity of the item by its predicted overall popularity. By multiplying this value by the predicted selection rate of the item with respect to particular criteria (determined by applying the predictor function as explained above), a useful estimate of how often the item will actually be selected by users having those criteria can be obtained.

Referring now to FIG. 1, a computer system 100 for rating search results may include a user workstation 110, a search engine 120, a database 130, a query log 140 and a click log 150. In some embodiments, user workstation 110 is a general purpose computer workstation including a keyboard 112, a video display 114, a pointing device (e.g. a mouse) 116, and a web browser software program 118. Search engine 120 may be a computer programmed with software that is capable of communicating, directly or indirectly, with user workstation 110 and of accessing database 130, query log 140, and click log 150. In particular, search engine 120 is capable of receiving a search query entered by a user through web browser 118 and of displaying to the user, through web browser 118, lists of items in database 130 that satisfy criteria in the search query. The lists are displayed in web browser 118 in hypertext format so that a user may use pointing device 116 to request that selected items from a list be displayed in web browser 118.

Referring now to FIG. 1a, database 130 may be any collection of items 132 of data capable of being searched. In some embodiments, database 130 is a catalog of information resources located on the World Wide Web. The catalog may have been accumulated by a "spider" program that follows World Wide Web hyperlinks to accumulate data about accessible Web pages. Each item 132 in the catalog includes the Universal Resource Locator (URL) 134 for an information resource located on the Web, a title 136 associated with the resource, and a short squib 138 of text describing the contents of the resource. The catalog includes an index 139 in which items in the catalog are indexed according to keywords 141 extracted from the information resource, and other searchable features 143 (e.g. date that the item was placed in the catalog, country of origin, language, etc.) associated with the resource.

A query log 140 includes a set of query records 170. Each query record 170 includes a normalized query 172, and a query count 174 representing the number of times the query was previously received by the search engine 120 from a user. (Alternatively, a query log may contain individual entries corresponding to every time that a raw (un-normalized) query was received by the search engine, and the query count for a particular normalized query may be calculated when needed by counting the number of entries having raw queries corresponding to that normalized query.) Click log 150 contains a set of click records 180, identifying every instance in which a user "clicked" on (i.e., selected) an item returned by the search engine. Each click record 180 includes a URL 182 selected by the user, the particular normalized query 184 for which the URL was returned to the user who did the selection, and a relevance rank 186 of the URL with respect to the query. Steps for determining the relevance rank will be discussed below.

Computer system 100 may be implemented by one or more general or special purpose computers that execute one or more application programs written in a computer programming language.

Figure 2:
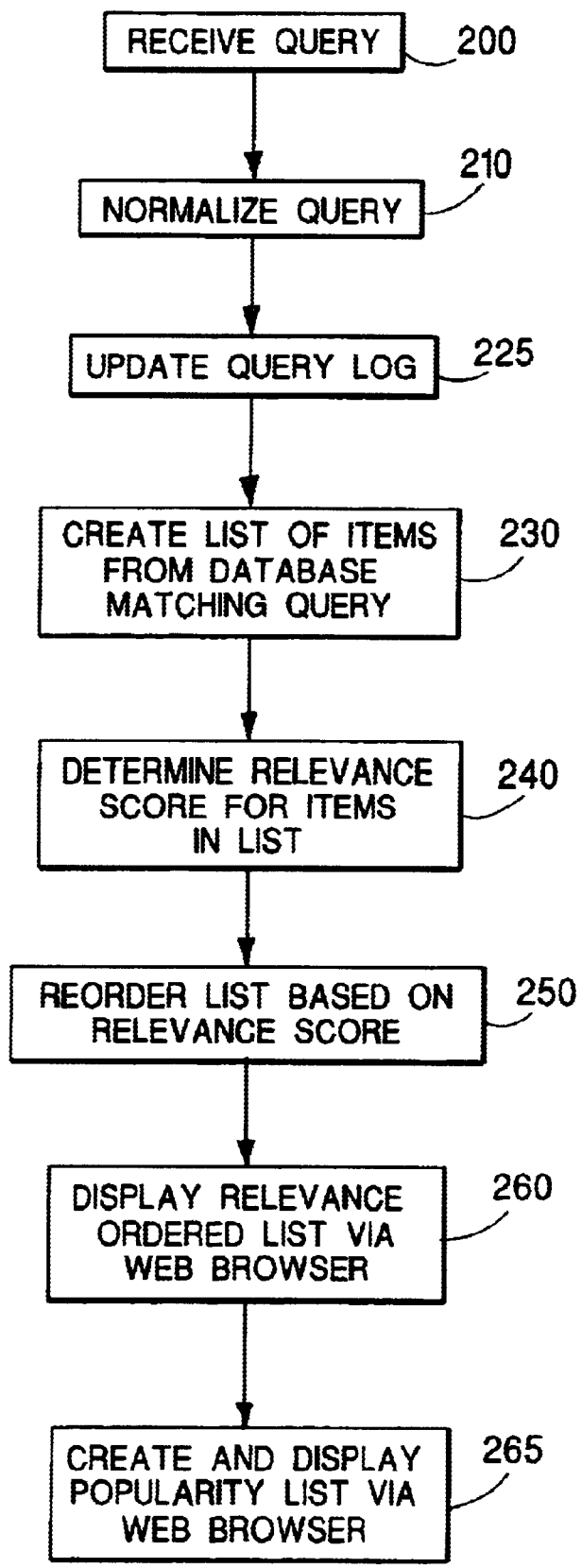

Referring now to FIG. 2, the operation of search engine 120 will be described in more detail. In general, search engine 120 receives a query from a user through the user interface 110 (step 200). The search engine 120 normalizes the query by placing it into a standard format that is semantically equivalent to the query (step 210). In some embodiments, this normalization process may include removing leading, trailing, and excess whitespace characters, converting upper case characters to lower case characters, and encoding certain non-alphanumeric characters to avoid incompatibility with internally used character codes. Normalization may also include other steps, such as removing certain common words from the query. After the query has been normalized, the query log 140 is updated by incrementing the query count 174 for the query record 170 corresponding to the normalized query (step 225).

Next, the search engine 120 searches the database 130 for items 132 that match criteria specified in the normalized query and creates a list of matching items (step 230). The search engine then applies a relevance metric to each of the matching items to produce a relevance score (with respect to the particular query) (step 240). The relevance score may be determined by applying any known or subsequently developed metric that compares one or more intrinsic characteristics of an item with one or more criteria in a search query, for example those described in Manning and Schuitze, "Foundations of Statistical Natural Language Processing", MIT Press, Cambridge, Mass. (1999) pp. 529–574 and U.S. Pat. No. 6,012,053. After the relevance metric has been applied to each of the matching items, the list of matching items is reordered so that the items with higher relevance scores are placed in lower numbered rank positions (i.e., closer to the beginning of the list) (step 250).

After the list of matching items has been reordered according to relevance scores, search engine 120 displays the list to the user through the web browser 118 (step 260). In some embodiments, search engine 120 will initially display a web page that includes only the lowest ranked items in the list (i.e. those having the highest relevance factors), displayed in rank order, and allow the user to request the display of additional web pages that display successively higher ranked (i.e., less relevant) items. Each item is displayed with a title, a squib, and a hyperlink that enables the user to click on the item to display the underlying information resource it describes. The hyperlinks in the displayed pages are configured so when the user clicks on a particular hyperlink to select one of the displayed items, the user's web browser transmits an HTTP request to the search engine to display the underlying information resource described by the item. For example, if a displayed item describes a particular web page, clicking on the associated hyperlink will cause a request to display that web page to be sent to search engine 120. Requests are sent to the search engine, rather than to the web server on which the underlying resource is located, to permit the search engine to keep track of what requests are made in response to the results of particular queries. Once received at the search engine, these requests are processed (as described below) and forwarded to the appropriate web server. (In non-Web based embodiments, the underlying information resource may be a record from database 130, which can be retrieved by search engine 120 directly.)

The list of items displayed in order of relevance score will be referred to as a "relevance list." In addition to creating and displaying the "relevance list" for a particular query, search engine 120 also creates and displays a separate "popularity list" for the received query (step 265). The popularity list includes popular items that have been previously selected by users in response to the same normalized query in the past. As with the items on the "relevance" list, the items on the "popularity" list each include a title and squib and a hyperlink enabling a user to access the underlying information resource. In some embodiments, the popularity list is displayed in the web browser simultaneously with the relevance list (i.e. in different parts of the same Web page). The steps taken to create the popularity list will be described below.

Figure 3:
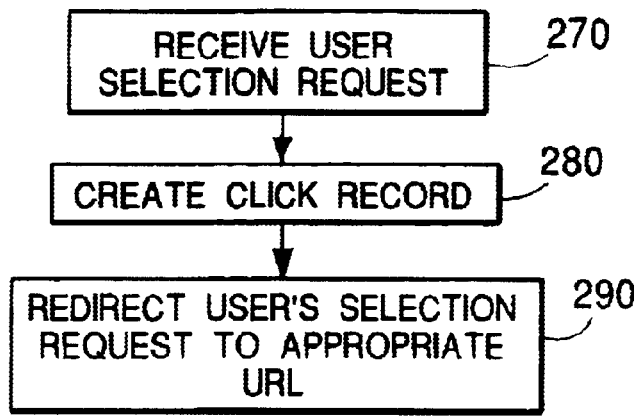

Referring now to FIG. 3, the following steps are taken when a user selects one of the items displayed in either the relevance list or the popularity list. The search engine receives the selection request (step 270) and creates a click record 180 in the click log 150, which includes the URL 182 of the item, along with the normalized query 184 and the rank 186 of the item in the relevance list displayed to the user (the "relevance rank" of the item with respect to the query) (step 280). (In some embodiments, even if the item is selected from the popularity list, the rank recorded in the click log is the relevance rank.) The search engine then redirects the user's request to the URL of the underlying information resource, using standard HTTP techniques known to those of skill in the art, which causes the underlying information resource to be displayed on the user's web browser (step 290). Because a user may wish to select more than one of the items displayed by the web browser, steps 270 through 290 may be repeated as many times as the user clicks on items in the list of matching items.

Figure 4:
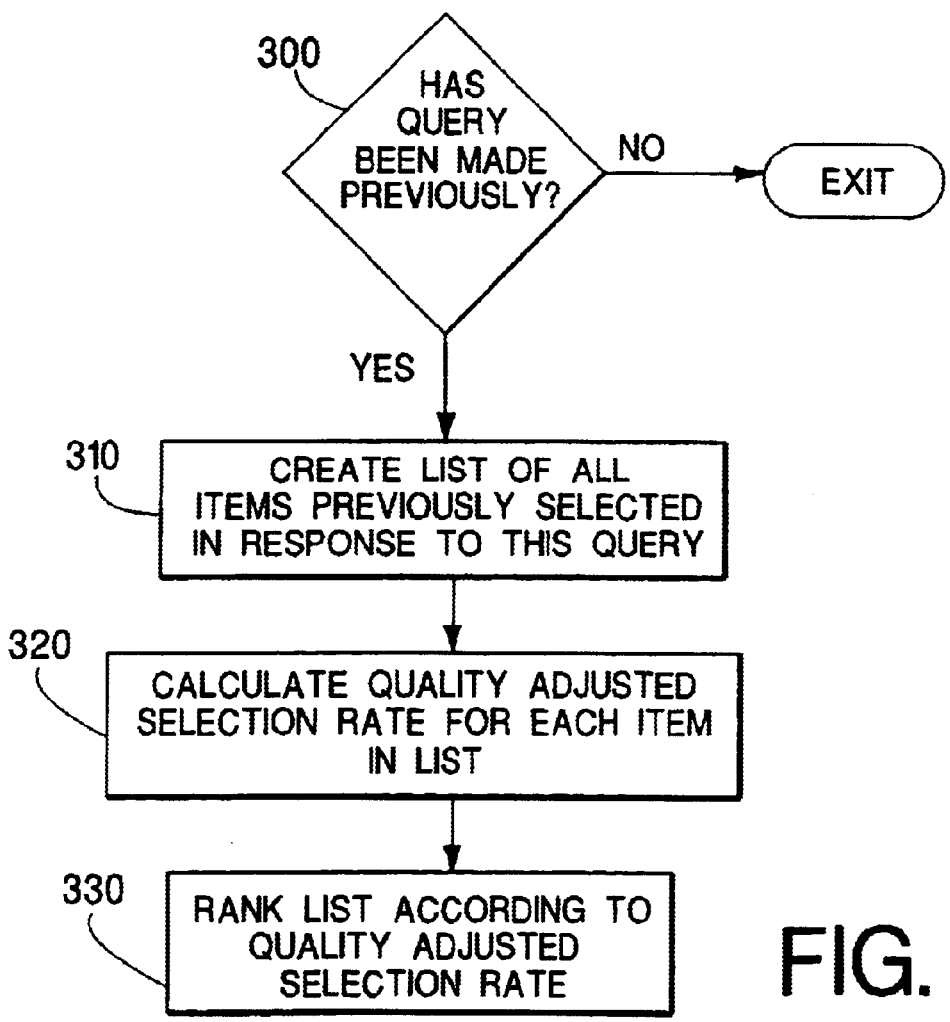

Referring now to FIG. 4, a routine for creating a popularity list for a particular normalized query list will be described. After a query received by the search engine has been normalized, it is compared to information in the query log 140 to determine whether the query is one that has previously been made by a user (step 300). If the query is not one that has previously been made, no popularity list will be created, and the routine exits. If the query was previously made (as reflected by a non-zero query count 174 in the relevant query record 170 in query log 140), then click log 150 is scanned to create a list of all of the items in database 130 that a user previously selected in response to the same normalized query (step 310).

Once the items in the popularity list have been determined, a Quality Adjusted Selection Rate (with respect to the current normalized query) is calculated for each item (step 320). The items in the popularity list are then ranked according to the values of their respective Quality Adjusted Selection Rates (step 330).

Figure 5:
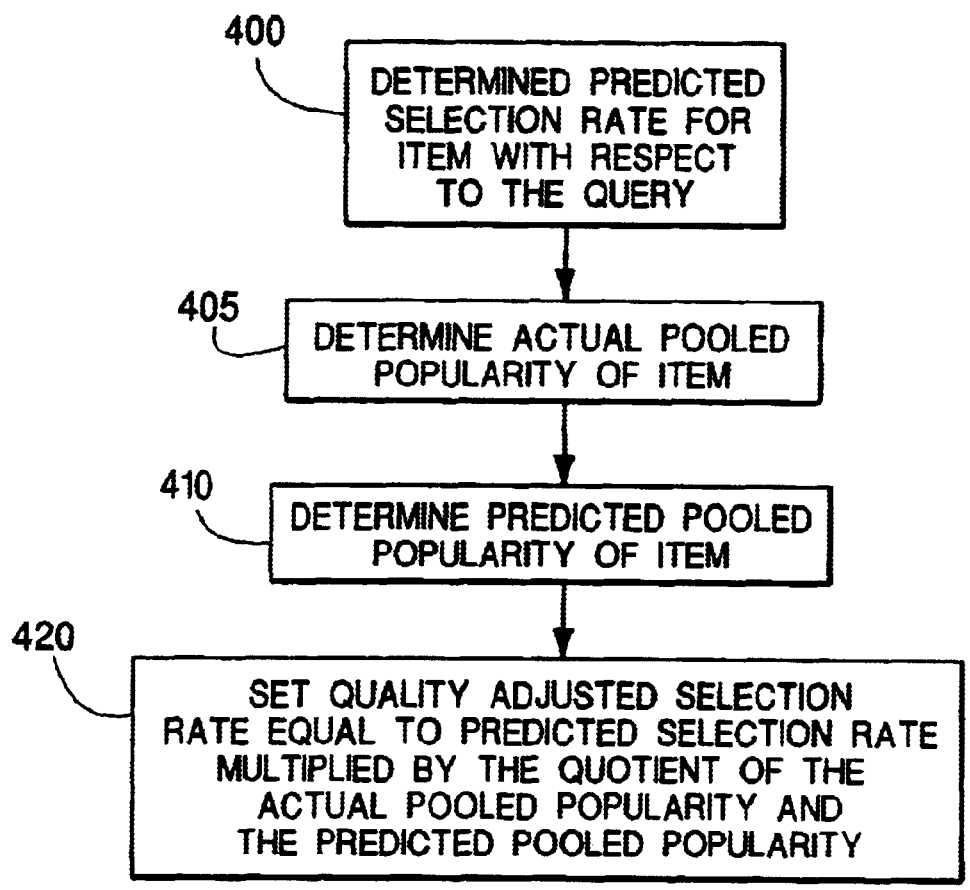

Referring now to FIG. 5, steps for determining the Quality Adjusted Selection Rate for an item in database 130 with respect to a particular query will be described.

First, a Predicted Selection Rate for the item with respect to the particular query is determined by applying a Selection Rate Predictor function SRP(rank) to the relevance rank of the item with respect to the query (step 400). In general SRP(rank) may be a function that varies inversely with the numerical relevance rank (i.e., an item ranked first will have a high value for SRP(rank), and an item ranked second will have a lower value for SRP(rank)), and serves to estimate the expected selection rate (i.e., number of times an item was selected divided by number of times item was returned in response to a query) of items in a relevance ranked list as a function of their relevance ranking. An appropriate SRP (rank) for a given search engine can be determined empirically, for example by determining historical selection rates by analyzing historical data from click log 180. A variety of factors, such as the display format of the search engine, the average sophistication of users, and the types of data being searched, will impact the values of SRP(rank). SRP(rank) may be implemented as a lookup table that matches ranks to empirically determined values. Alternatively, SRP(rank) may be a closed form equation. For example, in an Internet search engine in which results are displayed on pages having ten results per page, the following formula for SRP(rank) has been found to fit the empirical data fairly well:

$$SRP(rank) = \frac{a}{b+x} + \frac{c}{(11-x)^d},$$

where $$x = (rank-1) \bmod 10 + 1$$

$$p = \operatorname{int}\left(\frac{rank-1}{10}\right) + 1$$

$$a = \frac{.0570}{p^{1.75}}$$

$$b = 21 - \frac{19}{p^{0.75}}$$

$$c = \frac{.00114}{p^{1.75}}$$

$$d = 1.75$$

Next, an Actual Pooled Popularity value for the item is calculated (step 405). The Actual Pooled Popularity value provides a measure of the overall number of times that the item has been selected by users, without respect to the particular query for which the item was a match when it was selected. Steps that may be used to determine the Actual Pooled Popularity value will be described below.

Next, a Predicted Pooled Popularity value for the item is determined (step 410). As explained in more detail below, the Predicted Pooled Popularity value is a prediction of how popular the item would be based solely on considerations of its relevance to queries that have previously been entered by users in the click log 150.

After the Actual Pooled Popularity value, the Predicted Pooled Popularity value and Predicted Selection Rate for the item with respect to the query are determined, the Predicted Selection Rate is multiplied by the Quality-Based Correction Factor, i.e., the quotient of the Actual Pooled Popularity and the Predicted Pooled Popularity, to obtain the Quality Adjusted Selection Rate of the item with respect to the query (step 420).

Figure 6:
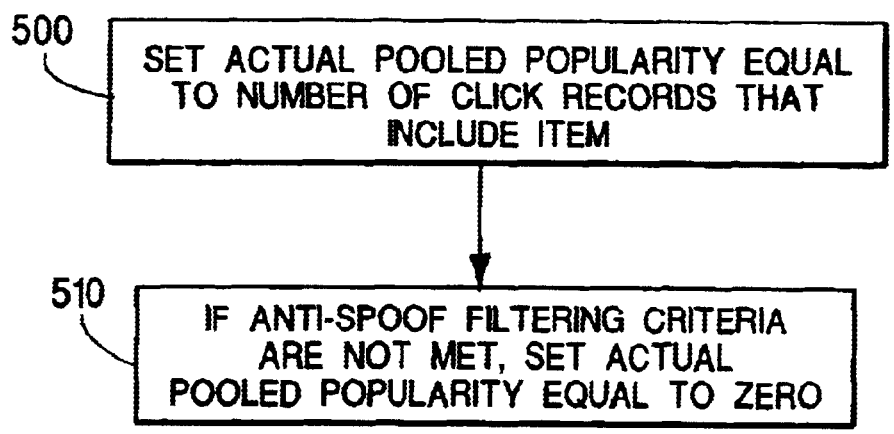

Referring now to FIG. 6, the following steps may be used to determine the Actual Pooled Popularity value for an item. First, the number of click records 180 in click log 150 that include the item are counted, and the Actual Pooled Popularity is set equal to that number (step 500). This number indicates the number of times that the item was selected by a user in response to any query. (In some embodiments, certain clicks originating from outside of the normal search engine interface are not counted. For example, certain click records may reflect "clicks" that are made through a metacrawler program. Such programs can query a number of search engines and then display a combined output of those search engines in a single list. When a user selects a displayed item by clicking on it, the request may be forwarded back to the search engine, thus counting as a "click." It may be useful to disregard such "clicks" because they do not represent clicks from a relevance ranked list produced by the search engine.)

In some embodiments, Actual Pooled Popularity values that do not satisfy certain anti-spoofing filter criteria are considered equal to zero (step 510). The anti-spoofing filter criteria filter out Actual Pooled Popularity values that may have been artificially inflated by interested persons who may have repeatedly clicked on the item after having performed a single search for it, or who may have used software to repeatedly search for and select the item over a period of time. A number of different anti-spoofing filter criteria may be used. For example, a "spoof limit" may be set equal to the total number of times a query from which the item was selected was received by the search engine, and the criteria may require that the Actual Pooled Popularity value be less than the spoof limit. (An Actual Pooled Popularity value greater than the spoof limit would indicate that the item was selected on average more than once every time it was displayed in response to a query).

Actual Pooled Popularity values may also be filtered out if they result from suspicious patterns of clicks reflected in click log 150. For example, click log records 180 may include a timestamp, permitting analysis of the rate at which clicks are received over different periods of time. The number of clicks selecting the item over different periods of time may be calculated. If one or more periods of time have unusually high or low numbers of clicks selecting the item (e.g., more than two standard deviations from the average), this may indicate an attempt at artificial manipulation, and may be a basis for filtering out the resulting Actual Pooled Popularity value.

Conversely, if there is too much regularity in the number of clicks selecting the item in different times periods, this may also indicate an attempt at artificial manipulation and be a basis for filtering out the resulting Actual Pooled Popularity value. The amount of regularity may be determined by a measure of the informational entropy in the pattern of selections during different time periods. The entropy in the selection pattern for N time periods may be expressed as:

$$Entropy = -\sum_{1}^{N} APSR_i \cdot \operatorname{Log}_2(APSR_i),$$

where $APSR_i$ is the Actual Pooled Selection Rate of the item during the ith time period. The APSR is a measure of how often the item was selected during the period compared to the number of opportunities for selection. The APSR may be determined by taking the number of times the item was selected during the time period (as indicated in click log 150) divided by the number of times a query was made by a user during that period (as indicated in query log 140). Alternatively, the APSR may be determined by taking the number of queries made during the period from which the item was selected (i.e., multiple selections of the item from the same query are counted only once) divided by the number of times a query was made during the period. Multiple selections of an item from the same query may be identified by assigning to each query a unique serial number and recording the serial number of the query from which an item is selected with the click record 180 in click log 150. Alternatively, such selections may be identified by recording the IP address of the source of each query and selection in query log 140 and click log 150, and then ignoring repeat selections from the same IP address until after a subsequent query is received from that address.

Still another alternative is to determine the APSR by taking the number of times the item was selected during the period (as indicated in click log 150) and dividing it by the total number of item selections made during the period (as also indicated in click log 150).

In general, the entropy is a theoretical measure of the number of bits needed to represent the actual distribution of the number of selections over the N time periods. If this value is less than a particular threshold, e.g., two bits, this may be a basis for filtering out the Actual Pooled Popularity value.

Referring now to FIG. 7, the following steps may be used to calculate the Predicted Pooled Popularity of an item. For each normalized query 184 with which the item's URL 182 is associated in a click record 180, SRP(rank) is computed for the rank 186 of the item with respect to that query, and then multiplied by the number of times the query was submitted by a user (obtained from the appropriate query record 170 in query log 140) (step 610). All of these products are then summed to obtain the Predicted Pooled Popularity (step 620).

The steps for determining the Quality Adjusted Selection Rate of an item with respect to a query can be restated in symbolic terms as follows: Assume that click log 180 reflects that the item has been selected by a user in response to N distinct normalized queries: $q_I$, through $q_N$. Let $r(q_x)$ represent the relevance ranking of the item with respect to query $q_x$, and $a(q_x)$ represent the number of times that query $q_x$ was previously submitted by a user. Let APP represent the Actual Pooled Popularity of the item. The Predicted Pooled Popularity of the item may be expressed as follows:

$$\sum_{x=1}^{N} [a(q_x) \cdot SRP(r(q_x))].$$

The Quality-Based Correction Factor of the item may be expressed as the quotient of Actual Pooled Popularity of the item and the Predicted Pooled Popularity of the item, as APP $$\frac{APP}{\sum_{x=1}^{N} [a(q_x) \cdot SRP(r(q_x))]}.$$

Thus, the Quality Adjusted Selection Rate for the item with respect to a particular query $q_a$ may be expressed as the Predicted Selection Rate for the item with respect to $q_a$, multiplied by the Quality-Based Correction Factor of the item, as follows:

$$\text{Quality Adjusted Selection Rate} = \frac{APP \cdot SRP(r(q_a))}{\sum_{x=1}^{N} [a(q_x) \cdot SRP(r(q_x))]}.$$

Other embodiments are within the scope of the following claims.

For example, a static query log and click log, that is a "data snapshot" of the query log and click log as of a certain date, may be used to determine the Actual Pooled Popularity values, Predicted Pooled Popularity values, Predicted Selection Rates and Quality Adjusted Selection Rates. In addition, the query log and click log may be limited to contain data received during a particular window of time (e.g., a fixed one week period). In addition, the query log and click log may be limited to contain data only with respect to queries having some minimum threshold of popularity (as evidenced by the total number of times the query was asked over some period of time).

Also, some or all of the Actual Pooled Popularity values, Predicted Pooled Popularity values, Predicted Selection Rates and Quality Adjusted Selection Rates for particular combinations of queries and items can be calculated in advance of their being needed. For example, if the contents of the query log and click log were limited to a "data snap shot" as of a certain time, the Actual Pooled Popularity values, Predicted Pooled Popularity values, Predicted Selection Rates and Quality Adjusted Selection Rates for all combinations of queries and items reflected in the click log could be calculated at that time, and stored in a separate database for use in generating popularity lists in real time. Alternatively, the "popularity list" for each query reflected in the click log could also be determined at the time the Quality Adjusted Selection Rates are determined.

The search engine may display in the relevance list only those items that do not appear in the popularity list. Also, in some embodiments the search engine may not display a separate relevance list and popularity list, but may instead display a single list ordered according to relative Quality Adjusted Selection Rates. In such an embodiment, items in the relevance list that did not have an Actual Pooled Popularity value (because they had never before been selected by a user) could be assigned a Quality Adjusted Selection Rate equal to the value of the Selection Rate Predictor function (i.e. the expected selection rate in the absence of any information about quality).

There may be two or more such databases from which the items contained in the relevance lists may be selected. Further, in response to any given query, the relevance list created may contain items from only one of the databases, and separate query and click logs may be kept with respect to the separate databases. For a given user query, a relevance list may be created from items in one database, and a popularity list may be created based on data in query and click logs related to a different database.

Items selected from the popularity list may be processed differently from items in the relevance list. For example, the click log may keep separate track of the selections of an item from the popularity list and from the relevance list, and only selections from the relevance list may be counted toward the Pooled Popularity value for the item. Alternatively, separate Quality Adjusted Selection Rates may be calculated for the popularity list and the relevance list, and a weighted sum of those values (weighted by the relative number of times the item was selected from the relevance list and from the popularity list) may be used as ultimate Quality Adjusted Selection Rates for determining ranking on the popularity list.

The Selection Rate Predictor function is not limited to using relevance rank as an input, and may be any function for predicting how often the item will be selected from a list of other items. For example, the Selection Rate Predictor function could be a function of the relevance score of an item with respect to a query.

The search engine is not limited to searching based on queries entered by users. For example, the search engine could search for items based on a user profile (e.g. a list of topics of interest to the user, demographic information about the user, or prior selection patterns of the user), or other contextual information. The Selection Rate Predictor function would then be a function of a measure of the relevance of an item with respect to the user profile or other contextual information.

SRP(rank) need not be defined in terms of the number of selections of an item compared to total queries, but may be any function that roughly predicts the relative frequency with which an item of a given rank will be selected by users compared to items of other ranks. For example, SRP(rank) could be defined in terms of the number of selections of an item during a given time period compared to the total number of selections of all items during the same time period. In other words, the SRP may be defined as an estimate of the percentage of all selections during a given period that are selections of items having a particular rank. Values of SRP(rank) could still be determined empirically, based on historical click log data. Using such a definition for SRP(rank), $a(q_x)$ could also be redefined (for purposes of determining the Quality-Adjusted Selection Rate per the equation above) as the number of selections of items in response to query $q_x$ (according to the click log 150) rather than the number of times query $q_x$ was entered by a user (thus taking into account the possibility of multiple or zero selections of items from the results of a given query). In this way, there would be no need to reference the query log 140 to determine the Quality-Adjusted Selection Rate.

Other embodiments are within the scope of the following claims.

What is claimed is:

1. A method for determining a measure of the usefulness of an item in a collection of information with respect to a first set of one or more criteria comprising:
    (a) determining a first measure of the usefulness of the item with respect to the first set of criteria;
    (b) determining a measure of the quality of the item; and
    (c) determining a second measure of usefulness based on the first measure of usefulness and the measure of quality, wherein determining a first measure of the usefulness of the item comprises:
       i. determining a measure of the relevance of the item to the first set of criteria; and
       ii. predicting a selection rate of the item based on the measure of relevance.

2. The method of claim 1, wherein determining a measure of relevance of an item to a set of criteria comprises determining the rank of the item in a list of items relevant to the set of criteria and ranked according to a relevance metric.

3. The method of claim 1, wherein determining a measure of quality of the item comprises:
    i. providing opportunities for user selection of the item;
    ii. determining the actual overall popularity of the item;
    iii. predicting the overall popularity of the item; and
    iv. determining the measure of quality of the item based on the actual popularity of the item and the predicted overall popularity of the item.

4. A method for determining a measure of the usefulness of an item in a collection of information with respect to a first set of one or more criteria comprising;
    (a) determining a first measure of the usefulness of the item with respect to the first set of criteria;
    (b) determining a measure of the quality of the item; and
    (c) determining a second measure of usefulness based on the first measure of usefulness and the measure of quality, wherein determining a measure of quality of the item comprises:
       i. providing opportunities for user selection of the item;
       ii. determining the actual overall popularity of the item;
       iii. predicting the overall popularity of the item; and
       iv. determining the measure of quality of the item based on the actual popularity of the item and the predicted overall popularity of the item.

5. The method of claim 4, wherein providing opportunities for user selection of the item comprises:
    (a) displaying a plurality of sets of items containing the item;
    (b) receiving from a user a choice of the item from at least one of the sets of displayed items.

6. The method of claim 5, wherein at least one set of items containing the item is displayed ranked in accordance to a relevance metric.

7. The method of claim 5, wherein at least one set of items containing the item is displayed ranked in accordance to a measure of the usefulness of the respective items.

8. The method of claim 4, wherein predicting the overall popularity of an item comprises:
    (a) providing users with opportunities to present sets of criteria;
    (b) determining respective measures of the relevance of the item to respective sets of criteria presented by users;
    (c) predicting respective selection rates of the item based on the respective measures of relevance; and
    (d) predicting the overall popularity based on the respective predicted selection rates.

9. The method of claim 7, further comprising:
    (e) determining respective measures of the popularity of the respective sets of criteria among users; and
    (f) predicting the overall popularity based on the respective predicted selection rates and the respective measures of the popularity of the respective sets of criteria.

10. The method of claim 9, wherein predicting a selection rate based on the measure of relevance comprises:
    (a) providing users with opportunities to select items from lists of items ranked according to ranking criteria;
    (b) collecting data about selection rates of items having particular ranks;
    (c) predicting the selection rate based on the rank of the item and the data about selection rates of items having particular ranks.

11. The method of claim 8, wherein predicting the overall popularity of an item further comprises:
    (e) multiplying the respective predicted selection rates by the respective measures of popularity of respective sets of criteria; and
    (f) adding the resulting products to determine the predicted overall popularity of the item.

12. The method of claim 4, wherein determining the actual overall popularity value for the item further comprises determining the number of times that the item was selected by a user during a pre-determined period of time.

13. The method of claim 1 or 4, wherein the collection of information comprises a catalog of information resources available on a public network.

14. The method of claim 13, wherein the collection of information comprises a catalog of information available on the World Wide Web.

15. The method of claim 4, further comprising:
    (d) collecting data concerning selection of the item by users,
    (e) applying an anti-spoof criterion to the data;
    (f) decreasing the actual overall popularity of the item based on the results of applying the anti-spoof criterion to the data.

16. The method of claim 15, further comprising:
    displaying items from a collection of information ranked according to a relevance metric that is different from the second measures of usefulness.

17. The method of claim 15, wherein applying the anti-spoof criterion comprises comparing the actual overall popularity of the item to a threshold value.

18. The method of claim 15, wherein applying the anti-spoof criterion comprises comparing the actual overall popularity of the item in a particular time period to the actual overall popularity of the item in other time periods.

19. The method of claim 15, wherein applying the anti-spoof criterion comprises determining the entropy of a selection rate of the item in a series of time periods and comparing the entropy to a threshold value.

20. The methods of claim 1, 11, or 19, wherein the selection rate of an item is based on the number of times the item is selected during a given period relative to the number of queries made by users during that period.

21. The methods of claim 1, 17, or 19, wherein the selection rate of an item is based on the number of times the item is selected during a given period relative to the number of selections of items during that period.

22. The method of claim 4, further comprising:
   (d) determining respective first measures of the usefulness of respective other items in the collection of information with respect to the first set of criteria;
   (e) determining respective measures of the quality of the respective other items;
   (f) determining respective second measures of usefulness of the respective other items based on the respective first measures of usefulness and the respective the measures of quality; and
   (g) displaying the item and the other items ranked according to the respective second measures of usefulness.

23. The method of claim 22, wherein the items displayed according to the relevance metric are from a different collection of information than the items displayed according to respective second measures of usefulness.

24. The method of claim 1 or 4, wherein the first set of criteria is based on a search criterion received from a user.

25. The method of claim 1 or 4, wherein the first set of criteria is based on a user profile.

26. The method of claim 1 or 4, wherein the first set of criteria is based on a user's prior search patterns.

27. The method of claim 4, wherein determining the actual overall popularity of the item comprises:
   (a) providing users with at least one preferred interface for selecting the items from lists of items; and
   (b) determining the actual overall popularity of the item without regard to selection of the item using interfaces other than a preferred interface.

28. A system for determining a measure of the usefulness of an item in a collection of information with respect to a first set of one or more criteria comprising:
   (a) means for determining a first measure of the usefulness of the item with respect to the first set of criteria;
   (b) means for determining a measure of the quality of the item; and
   (c) means for determining a second measure of usefulness based on the first measure of usefulness and the measure of quality,
      wherein determining a first measure of the usefulness of the item comprises:
         i. determining a measure of the relevance of the item to the first set of criteria; and
         ii. predicting a selection rate of the item based on the measure of relevance.

29. A system for determining a measure of the usefulness of an item in a collection of information with respect to a first set of one or more criteria comprising:
   (a) computer processor;
   (b) a memory for holding the collection of information;
   (c) wherein the computer processor is programmed to:
      (1) determine a first measure of the usefulness of the item with respect to the first set of criteria;
      (2) determine a measure of the quality of the item; and
      (3) determine a second measure of usefulness based on the first measure of usefulness and the measure of quality;
         wherein determining a first measure of the usefulness of the item comprises:
            i. determining a measure of the relevance of the item to the first set of criteria; and
            ii. predicting a selection rate of the item based on the measure of relevance.

30. A computer program residing on a computer readable medium for determining a measure of the usefulness of an item in a collection of information with respect to a first set of one or more criteria, comprising instructions for causing a computer to:
   (a) determine a first measure of the usefulness of the item with respect to the first set of criteria;
   (b) determine a measure of the quality of the item; and
   determine a second measure of usefulness based on the first measure of usefulness and the measure of quality;
      wherein determining a first measure of the usefulness of the item comprises:
         i. determining a measure of the relevance of the item to the first set of criteria; and
         ii. predicting a selection rate of the item based on the measure of relevance.

* * * * *